US005880758A

United States Patent [19]

Stoffel et al.

[11] Patent Number: 5,880,758

[45] Date of Patent: Mar. 9, 1999

[54] PRINTER WITH PEN CONTAINING A LOW DOT SPREAD BLACK INK AND A HIGH DOT SPREAD COLOR INK

[75] Inventors: John L. Stoffel, San Diego; Keshava A. Prasad, San Marcos; Ronald A. Askeland, San Diego; Michele E. Shepard, Escondido; Frank Drogo, San Marcos; Leonard Slevin, San Diego, all of Calif.; Mark S. Hickman, Vancouver, Wash.; Clayton L. Holstun, Escondido, Calif.

[73] Assignee: Hewlett-Packard Company, Palo Alto, Calif.

[21] Appl. No.: 826,304

[22] Filed: Mar. 27, 1997

Related U.S. Application Data

[63] Continuation of Ser. No. 234,733, Apr. 28, 1994, abandoned.

[51] Int. Cl.$^{6}$ .............................. B41J 2/21; G01D 11/00

[52] U.S. Cl. .............................................. 347/43; 347/100

[58] Field of Search ................................ 347/43, 41, 15, 347/100, 40, 106, 47; 346/31.43, 31.46

[56] References Cited

U.S. PATENT DOCUMENTS

| | | | |
|---|---|---|---|
| 4,631,548 | 12/1986 | Milbrandt | 347/43 |
| 4,746,935 | 5/1988 | Allen | 347/43 |
| 4,872,026 | 10/1989 | Rasmussen et al. | 347/56 |
| 4,920,355 | 4/1990 | Katerberg | 347/43 |
| 5,043,741 | 8/1991 | Spehrley, Jr. | 347/88 |
| 5,091,005 | 2/1992 | Mueller et al. | 347/100 |
| 5,098,476 | 3/1992 | Baker | 347/100 |
| 5,100,470 | 3/1992 | Hindagolla et al. | 347/100 |
| 5,106,416 | 4/1992 | Moffatt et al. | 347/100 |
| 5,108,503 | 4/1992 | Hindagolla et al. | 347/100 |
| 5,112,399 | 5/1992 | Slevin et al. | 347/100 |
| 5,116,409 | 5/1992 | Moffatt | 347/100 |
| 5,118,350 | 6/1992 | Prasad | 347/100 |
| 5,133,803 | 7/1992 | Moffatt | 347/100 |
| 5,196,056 | 3/1993 | Prasad | 106/15.05 |
| 5,198,023 | 3/1993 | Stoffel | 347/100 |
| 5,220,342 | 6/1993 | Moriyama | 347/43 |
| 5,361,084 | 11/1994 | Paton et al. | 347/15 |
| 5,371,531 | 12/1994 | Rezanka et al. | 347/43 |
| 5,477,248 | 12/1995 | Sugimoto et al. | 347/43 |
| 5,485,183 | 1/1996 | Zandian et al. | 347/41 |
| 5,488,398 | 1/1996 | Matsubara et al. | 347/43 |

OTHER PUBLICATIONS

*Hewlett–Packard Journal* (vol. 45, No. 1, Feb. 1994).

*Primary Examiner*—N. Le
*Assistant Examiner*—Thinh Nguyen
*Attorney, Agent, or Firm*—Jerry R. Potts

[57] ABSTRACT

A color ink-jet printer is provided, with one pen for dispensing black ink onto a print medium and at least one pen for dispensing color ink onto a print medium. The pen for dispensing black ink is adapted to jet droplets of black ink of a first volume and the pen(s) for dispensing color ink are adapted to jet droplets of color ink of a second volume, with the first volume being larger than the second volume. Such a color ink-jet printer provides both superior text quality of the black ink and does not require as much ink volume of the color ink(s) as previous ink-jet printers.

33 Claims, 2 Drawing Sheets

PRINTER WITH PEN CONTAINING A LOW DOT SPREAD BLACK INK AND A HIGH DOT SPREAD COLOR INK

CROSS REFERENCE TO RELATED APPLICATION(S)

This is a continuation of application Ser. No. 08/234,733 filed on Apr. 28, 1994, now abandoned.

TECHNICAL FIELD

The present invention relates generally to ink-jet printers, and, more particularly, to color thermal ink-jet printers.

BACKGROUND ART

Ink-jet printers capable of forming color images using an ink set derived from cyan, yellow, magenta, and black inks are now commercially available. Specific types of ink-jet printers, such as thermal and piezo-electric, are also well-known.

The formation of color images onto the print medium, e.g., paper, requires inks having competing requirements. For example, the ink must be relatively quick drying, so as to avoid smearing of images. Yet, the ink must not be so quick drying that it clogs the printhead nozzles out of which it is jetted. Further, when printing color images, bleed (the invasion of one color by another) must be avoided. Various patents have been issued dealing with dye-based color components; examples of such patents, which are assigned to the same assignee as the present application, include U.S. Pat. Nos. 5,091,005, 5,098,476, 5,100,470, 5,106,416, 5,108,503, 5,112,399, 5,116,409, 5,118,350, 5,133,803, 5,196,056, 5,198,023. Typically, these inks comprise a vehicle (one or more water-miscible organic solvents and water) and one or more water-soluble dyes, or colorants. Additives may be present to improve a given property, such as waterfastness, color bleed, and the like.

Penetration of the ink into the print medium (e.g., paper) reduces bleed, while cost per copy is reduced by lateral spreading of the ink. Cockle of the paper is reduced by a lower drop volume (e.g., less water). On the other hand, edge acuity is reduced for an ink that has a high lateral spread on the paper.

Further tradeoffs are realized by considerations of surface tension and viscosity. The surface tension governs the wetting properties of the ink to the paper, and this in turn is governed by the nature of the paper (e.g., photocopy versus bond). Viscosity controls the amount of ink dot spread, with a higher viscosity limiting dot spread.

Dot gain is defined herein as the amount of spread for a given dot size compared to no spreading. Thus, a low dot gain ink does not spread as much as a high dot gain ink. Another way of viewing this is that for a given dot size, where a smaller drop volume give the same dot size as a larger volume of ink, then gain is attained.

A print cartridge with a high dot gain ink is advantageous in reducing cost-per-copy, bleed, and paper cockle. However, the best edge acuity of a high dot gain ink is inferior to the best edge acuity of a low dot gain ink. When printing black text, edge acuity is the most important feature. The amount of ink used in a single black text page is usually minimal. However, edge acuity is less important when printing color text because the contrast between the color print and white page is less than the contrast between the black print and the white paper. Furthermore, bleed, cockle, and cost-per-copy are more important in a color page as large amounts of inks are printed. Thus, a printer with a print cartridge containing a low dot gain black ink and at least one other print cartridge containing a high dot gain color ink would be advantageous.

It will be appreciated by those skilled in this art that reducing the amount of ink used to jet a given droplet of ink while maintaining high edge acuity for text printing requires balancing various considerations. Thus, an ink set that combines the advantages of both low dot spread and high dot spread, while alleviating the disadvantages of each, is required.

DISCLOSURE OF INVENTION

In accordance with the present invention, a color ink-jet printer is provided, with one print cartridge for dispensing black ink onto a print medium and at least one print cartridge for dispensing color ink onto a print medium. The print cartridge for dispensing black ink is adapted to jet droplets of black ink of a first volume and the print cartridge(s) for dispensing color ink are adapted to jet droplets of color ink of a second volume, with the first volume being larger than the second volume.

Such a color ink-jet printer provides both superior text quality of the black ink and does not require as much ink volume of the color ink(s) as previous ink-jet printers.

BEST MODES FOR CARRYING OUT THE INVENTION

Figure 1:
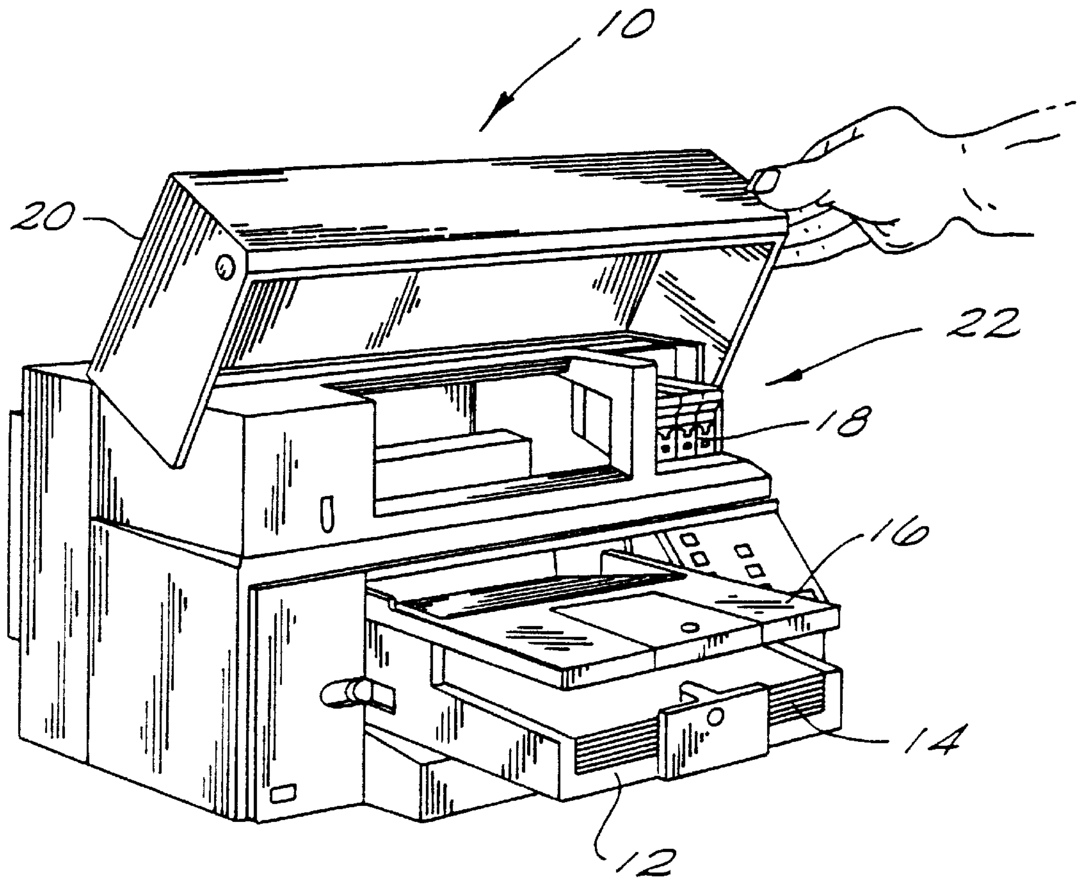
FIG. 1 is a perspective view of an exemplary ink-jet printer employed in the practice of the present invention.

Referring now to the figures, a printer 10 is shown in FIG. 1, comprising a paper feed tray 12 for storing a supply of paper or other print medium 14 to be printed, a paper collection tray 16 for collecting the printed paper, and a plurality of print cartridges 18. In the printer depicted in FIG. 1, four such cartridges are provided: cyan, yellow, magenta, and black, commonly referred to as CYMK, although only three are visible from the viewing angle chosen. Together, these four colors provide a wide palette of colors, tints, and hues. However, it will be readily appreciated by those skilled in this art that black plus at least one of cyan, yellow, and magenta may be employed in certain situations.

The printer 10 is depicted with its cover 20 raised to expose the service station 22 and the four cartridges 18 stored therein. Other features of the printer 10, such as the paper feed mechanism, printer electronics, etc., are not depicted, as they are well-known of ink-jet printing; see, e.g., U.S. Pat. No. 4,872,026, issued Oct. 3, 1989, and assigned to the same assignee as the present application.

The print cartridges 18 reside in the service station 22 when not in use or for servicing, which may include priming the pen, wiping the nozzle plate, and/or spitting all nozzle simultaneously into a spittoon to clear them.

The print cartridges may be based on thermal jetting action, employing a plurality of ink firing chambers, each containing a resistor element that, upon energizing, causes a bubble of ink to form, which is expelled through a nozzle toward the print medium. Alternatively, the print cartridge may be based on piezoelectric jetting action, employing a plurality of ink firing chambers, each containing a piezoelectric element that, upon energizing, expels a quantity of ink through a nozzle toward the print medium. Both thermal and piezoelectric print cartridges are well-known in the art of ink-jet printing. Preferably, a thermal ink-jet printer is employed in the practice of the present invention.

The configuration of the cartridges is immaterial in the practice of the present invention, and may comprise two, three, or four separate cartridges, or pens (as depicted in FIG. 1) or may comprise one pen with two, three, or four print cartridges, each containing a different ink. As used herein, the term "cartridge" is intended to cover both the situation involving separate pens (in which case, pen and cartridge are synonymous) and a monolithic pen containing multiple cartridges. In the latter case, the cartridges may be individually replaceable or tube-fed with ink from an off-axis ink supply.

In the use of an ink-jet printer, the platen may be at ambient temperature or the platen may be heated. A heated platen in conjunction with a thermal ink-jet printer has been disclosed and claimed in application Ser. No. 07/876,942, filed May 1, 1992, and in application Ser. No. 08/056,287, filed Apr. 30, 1993, which in turn is a continuation-in-part application of Ser. No. 07/876,924, filed May 1, 1992, all assigned to the same assignee as the present application. Heated platens are used to dry the ink faster on the print medium, which may be paper, transparency, or other suitable material.

Figure 2:
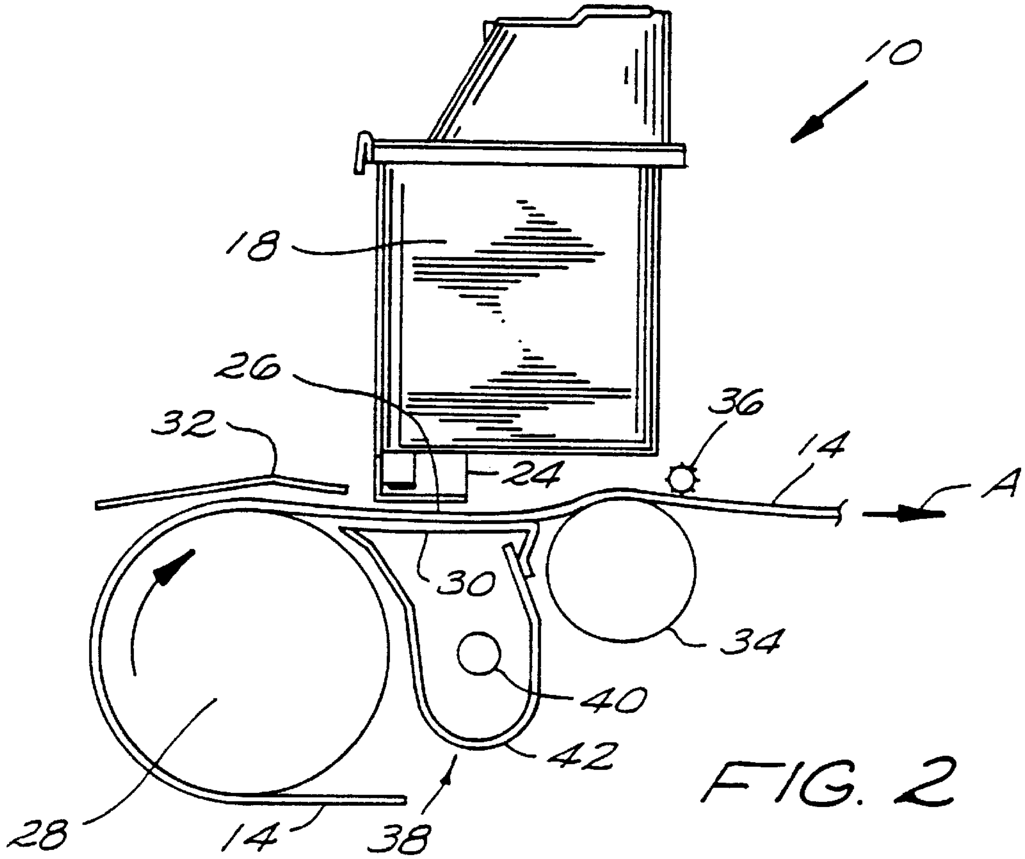
FIG. 2 is a schematic drawing of a portion of a thermal ink-jet printer, employing heating means, depicting the relation of the print cartridge with its printhead to the print medium and heating means.

FIG. 2 depicts a portion of the ink-jet printer 10 shown in FIG. 1, which is provided with a heated platen means. Specifically, the print medium is moved past the pen, or print cartridge, 18 having affixed thereto a printhead 24 in operative association with the print medium 14. The printhead 24 establishes a print zone 26. As is customary, the print medium 14 is moved along a paper path in the printer 10, in the direction denoted by arrow A, and the pen 18 is moved orthogonal thereto. The print medium 14 is moved by a drive roller 28 onto a screen 30. A drive plate 32, positioned after the drive roller 28 and prior to the pen 18 aids in holding the print medium 14 flat on the screen 30. The screen 30, which acts like a platen, is perforated so as to permit the drying of the print medium, as described more fully below. The print medium 14 exits the print zone 26 by means of an exit roller 34 and a plurality of starwheels 36 to be collected in the paper collection means, such as tray 16.

A recent modification in thermal ink-jet printers involves the use of a heating means, generally depicted at 38, which is positioned close to the print zone 18. In FIG. 2, the heating means 38 is depicted as comprising a print heater 40 and a reflector 42, which serves to concentrate the heat on the bottom of the print medium 14, through the screen 30. However, it will be readily apparent to those skilled in the art that the heating means 38 may comprise any of the usual heating sources, such as heating elements, blowers, and the like, and the practice of the present invention is not limited as to the heating source. Nor is the present invention limited to the placement of the heating source 38, which may be ahead of the print zone 26, behind the print zone, or in the print zone or which may be located beneath the print medium 14, as shown, or above it.

Figure 3:
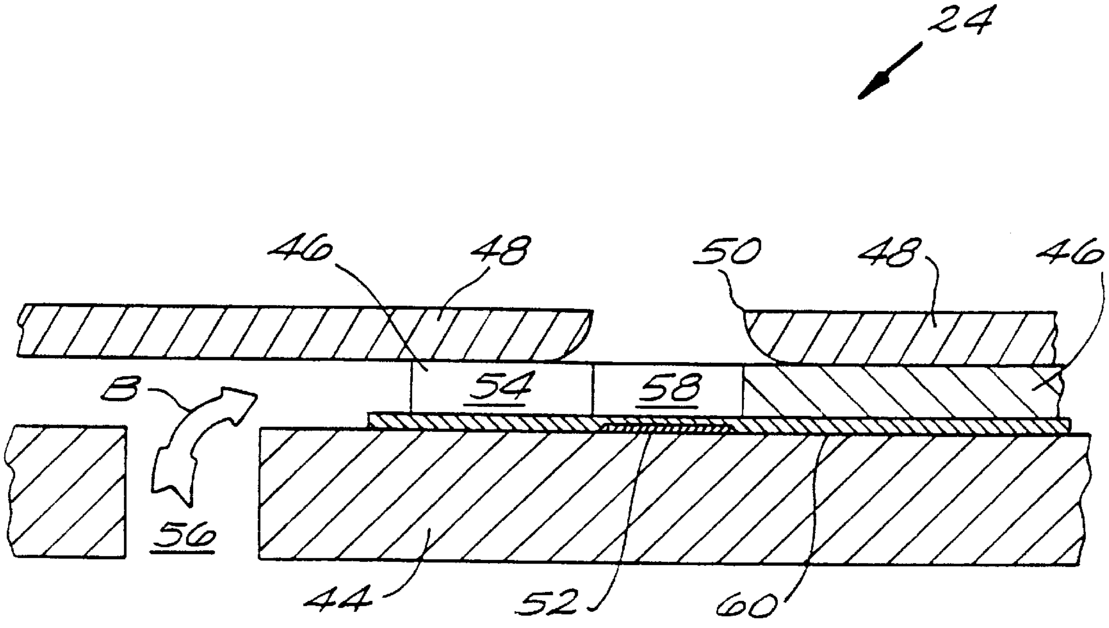
FIG. 3 is a cross-sectional view of a portion of a printhead in an ink-jet print cartridge, depicting one resistor element and its associated nozzle.

FIG. 3 depicts in cross-section a portion of the printhead 24, comprising a substrate 44, a barrier layer 46, and an orifice, or nozzle, plate 48 with an orifice, or nozzle, 50 therein. The nozzle 50 is positioned above a thermal element 52, commonly a resistor element, or heater-resistor. In practice, the orifice plate 48 has a plurality of nozzles 50 in it, each one operatively associated with a resistor 52, as is well-known. The present invention is not limited to the particular orifice plate 48 employed, which may be separate or integral with the barrier layer 46. Indeed, any orifice plate overlying the thermal element 52 may be employed in the practice of the present invention.

In operation, ink fills an ink feed channel 54, as shown by arrow B; each resistor is fed by such a channel, which is defined by the substrate 44, the barrier layer 46, and the orifice plate 48. Each resistor 52 is connected by an electrically conductive trace (not shown) to a current source (not shown), which, under the control of a microprocessor (not shown), sends current pulses to selected resistors 52, causing a droplet of ink to be expelled through the nozzle 50 and onto the print medium 14 in a desired pattern of alphanumeric characters, graphics, area-fill, and other print patterns. The details of such thermal ink-jet printers are described, for example, in the Hewlett-Packard Journal, Vol. 45, No. 1 (February 1994).

As further shown in FIG. 3, the ink flows up from through ink refill slot 56, into the ink feed channel 54, and thence into firing chamber 58. A passivation layer 60 lies over the substrate 44 and the resistor 52. This passivation layer 60 typically comprises a silicon nitride-silicon carbide material, as is well-known. Additionally, there are several other layers in the thin film construction of a thermal ink-jet printhead; these are omitted from the drawing for clarity.

In accordance with the present invention, lower ink cost per copy is achieved by providing a print cartridge drop volume that is about half that of previous ink-jet printers with 300 dots/inch (dpi) resolution (about 120 $\mu$m dot diameter). To attain the same dot size for 300 dpi but at half the typical drop volume is done by significantly changing the ink properties. In particular, in a given print cartridge architecture, an ink containing a surface-active agent produces a larger dot than an ink with no surface-active agent. The greater lateral spreading of these drops is a direct result of greater wettability of the ink to the paper fibers. A negative side effect is a slight loss in text edge acuity on some papers.

The resolution in a 300 dpi printer can be modified by resolution enhancement techniques to increase the resolution from 300-by-300 dpi to 600-by-300 dpi. The former resolution is used for a draft quality print mode, while the latter resolution is used for a high quality print mode.

There are two ways to view dot spread, or gain. The first is to consider the amount of spread on a print medium by a drop of a given volume. The larger the resulting dot size, the larger the dot spread, or gain. Alternatively, for a given dot size measured, the issue is whether it takes a relatively large drop volume to produce that dot size or a smaller drop volume. If a smaller drop volume can produce the same size as a larger drop volume, then dot gain is realized. A low dot spread, or gain, results from little lateral spread, while a large dot spread, or gain, results from considerable lateral spread.

For an ink with high dot spread, certain benefits are realized. First, less ink is required to achieve an acceptable image. This reduces both the cost per copy and the tendency of the paper to cockle when printed with rather large volumes of ink. Further, penetration by the ink into the paper reduces bleed.

There are tradeoffs to consider in this approach, involving both surface tension and viscosity of the ink. Both high surface tension and viscosity tend to limit dot spread. However, these values cannot be so low that spreading is unchecked. Typically, for a relatively high dot spread ink, the surface tension is in the range of about 25 to 40 dyne/cm and the viscosity is in the range of about 1.5 to 10 cp. For a relatively low dot spread ink, the surface tension is in the range of about 45 to 65 dyne/cm and the viscosity is in the range of about 1.5 to 10 cp.

To combine the desired high text quality associated with black ink and the desired reduced cost in printing color graphics, the black ink is formulated for minimal dot spread, while the color inks are formulated for increased dot spread. This increase in dot spread is achieved by adding one or more surfactants to the ink.

For a color ink-jet printer having a print resolution of 300-by-300 dpi or 360-by-360 dpi, the droplets of the low dot spread ink (black ink) have a volume in the range of about 90 to 130 pL and the droplets of the high dot spread ink (color inks) have a volume in the range of about 40 to 65 pL. Preferably, for such a printer employing a heated platen, the droplets of the low dot spread ink have a volume of about 105 pL and the droplets of the high dot spread ink have a volume of about 55 pL.

For a color ink-jet printer having a print resolution of 600-by-300 dpi or 720-by-360 dpi for black text printing, the droplets of the low dot spread ink (black ink) have a volume in the range of about 75 to 105 pL. Preferably, for such a printer employing a heated platen, the droplets of the low dot spread ink have a volume of about 90 pL.

The Table below illustrates the difference between low and high dot gain (spread) inks.

| Ink | Resolution (dpi) | Theoretical Spot Size Needed (μm) | Nominal Drop Vol. (pL) | Dot Gain (μm/pL) |
|---|---|---|---|---|
| Black | 300x300 | 120 | 105 | 1.1 |
| Black | 300x600 | 90 | 90 | 1.0 |
| Color | 300x300 | 120 | 55 | 2.2 |
| Black | 600x600 | 60 | 35 | 1.7 |

The high quality mode prints at 600-by-300 dpi resolution, which allows the application of HP Resolution Enhancement Technology rules to enhance the edge quality of the text characters. (HP Resolution Enhancement Technology is discussed by C. A. E. Hall et al, "Inkjet Printer Print Quality Enhancement Techniques", Hewlett-Packard Journal, pp. 35–40 (February 1994).) The fast mode prints at 300-by-300 dpi resolution, which allows printing each swath at twice the speed. However, since the drop volume for the high-quality mode is tuned for that mode, if the same drop volume were used for the fast mode, then the text would be too light because of more white space between drops. This problem is reduced by dynamically changing the drop volume between these two print modes. The drop volume is increased for the fast mode by increasing the control temperature used in the printhead temperature control process. The higher the printhead temperature, the larger the drops become. The resulting increase in dot size on the paper provides good print quality at six pages per minute with the same printhead that can do four pages per minute in the highest-quality mode.

INDUSTRIAL APPLICABILITY

The use of a low dot spread black ink in combination with at least one high dot spread color ink is expected to find use in thermal ink-jet printers.

Thus, there has been disclosed an ink-jet printer with a pen or pens containing a low dot spread black ink and a high dot spread color ink. It will be readily appreciated by those skilled in this art that various changes and modifications of an obvious nature may be made, and all such changes and modifications are considered to fall within the scope of the appended claims.

What is claimed is:

1. A color ink-jet printer including one print cartridge for dispensing black ink onto a print medium and at least one print cartridge for dispensing color ink onto a print medium, said print cartridge for dispensing black ink including means for jetting droplets of black ink, each droplet of said black ink having a first volume, and said at least one print cartridge for dispensing color ink including means for jetting droplets of color ink, each droplet of said color ink having a second volume, said first volume being larger than said second volume, said black ink having a first composition that provides a lower dot spread on said print medium compared to said color ink, which has a second composition that provides a higher dot spread on said print medium, wherein a dot formed on said print medium by a droplet of said black ink has an areal extent substantially equivalent to that of a dot formed on said print medium by a droplet of said color ink.

2. The color ink-jet printer of claim 1 including three print cartridges for dispensing color, with one print cartridge adapted to dispense cyan ink, a second print cartridge adapted to dispense yellow ink, and a third print cartridge adapted to dispense magenta ink.

3. The color ink-jet printer of claim 1 wherein said printer has a print resolution in a range of 300-by-300 to 360-by-360 dots per inch.

4. The color ink-jet printer of claim 3 wherein said droplets of said first volume range from 90 to 130 pL and said droplets of said second volume range from 40 to 65 pL.

5. The color ink-jet printer of claim 4 wherein said droplets of said first volume are about 105 pL and said droplets of said second volume are about 55 pL.

6. The color ink-jet printer of claim 1 wherein said printer has a print resolution in a range of 600-by-300 to 720-by-360 dots per inch for black text printing.

7. The color ink-jet printer of claim 6 wherein said droplets of said first volume are within a range of 75 to 105 pL.

8. The color ink-jet printer of claim 7 wherein said droplets of said first volume are about 90 pL.

9. The color ink-jet printer of claim 1 wherein each print cartridge comprises a separate pen.

10. The color ink-jet printer of claim 1 wherein all print cartridges together comprise a pen, with separate cartridges containing each ink.

11. The color ink-jet printer of claim 1 wherein each of said print cartridge comprises a plurality of firing chambers, each chamber provided with a resistor element for heating a quantity of ink to expel an ink droplet toward said print medium.

12. The color ink-jet printer of claim 1 further including a platen which supports said print medium, a portion of said platen provided with means for heating said print medium to reduce drying time of said ink.

13. The color ink-jet printer of claim 1 wherein said black ink has a surface tension within a range of about 45 to 65 dyne/cm and said color ink has a surface tension within a range of about 25 to 40 dyne/cm, such that said black ink has a lower dot spread on said print medium compared to said color ink.

14. A color thermal ink-jet printer including one print cartridge for dispensing black ink onto a print medium and three print cartridges for dispensing color ink onto a print medium, said print cartridge for dispensing black ink including means for jetting droplets of black ink, each droplet of said black ink having a first volume, and said print cartridges for dispensing color ink each including means for jetting droplets of ink, each droplet of said color ink having a second volume, said first volume being larger than said second volume, with one print cartridge adapted to dispense cyan ink, a second print cartridge adapted to dispense yellow ink, and a third print cartridge adapted to dispense magenta ink, said black ink having a first composition that provides a lower dot spread on said print medium compared to said color ink, which has a second composition that provides a higher dot spread on said print medium, wherein a dot formed on said print medium by a droplet of said black ink has an areal extent substantially equivalent to that of a dot formed on said print medium by a droplet of said color ink.

15. The color ink-jet printer of claim 14 wherein said printer has a print resolution in a range of 300-by-300 to 360-by-360 dots per inch.

16. The color ink-jet printer of claim 15 wherein said droplets of said first volume are within a range of 90 to 130 pL and said droplets of said second volume are within a range of 40 to 65 pL.

17. The color ink-jet printer of claim 16 wherein said droplets of said first volume are about 105 pL and said droplets of said second volume are about 55 pL.

18. The color ink-jet printer of claim 14 wherein said printer has a print resolution in a range of 600-by-300 to 720-by-360 dots per inch for black text printing.

19. The color ink-jet printer of claim 18 wherein said droplets of said first volume are within a range of 75 to 105 pL.

20. The color ink-jet printer of claim 19 wherein said droplets of said first volume are about 90 pL.

21. The color ink-jet printer of claim 14 further including a platen which supports said print medium, a portion of said platen provided with means for heating said print medium to reduce drying time of said ink.

22. The color ink-jet printer of claim 14 wherein said black ink has a surface tension within a range of about 45 to 65 dyne/cm and each of said color inks has a surface tension within a range of about 25 to 40 dyne/cm, such that said black ink has a lower dot spread on said print medium compared to each of said color inks.

23. A method of ink-jet printing onto a print medium, comprising applying to said print medium droplets of black ink, each droplet of said black ink having a first volume, and applying droplets of at least one color ink, each droplet of said color having a second volume, said first volume being larger than said second volume, said black ink having a lower dot spread on said print medium compared to said color ink such that a dot formed on said print medium by a droplet of said black ink has an areal extent substantially equivalent to that of a dot formed on said print medium by a droplet of said color ink.

24. The method of claim 23 wherein said black ink has a surface tension in a range of about 45 to 65 dyne/cm and at least one color ink has a surface tension in the range of about 25 to 40 dyne/cm.

25. The method of claim 23 wherein said print medium is heated so as to aid in drying of said ink on said print medium.

26. A color ink-jet printer, including:

(a) at least one low dot gain print cartridge for helping to facilitate edge acuity in a black text print mode of operation;

(b) said at least one low dot gain print cartridge ejecting high volume black ink droplets of a sufficient volume to enhance edge acuity in both a fast draft quality print mode of operation and a slow quality print mode of operation;

(c) at least one high dot gain print cartridge for helping to facilitate minimized ink drop bleeding in a color text print mode of operation;

(d) said at least one high dot gain print cartridge ejecting low volume color ink droplets of another sufficient volume to permit color printing in both said fast draft quality print mode of operation and said slow high quality print mode of operation;

(e) a low dot gain ink source for supplying low dot gain ink to said at least one low dot gain print cartridge; and (f) a high dot gain ink source for supplying high dot gain ink to said at least one high dot gain print cartridge, wherein said sufficient volume of said black ink droplets is a substantially greater volume than said another sufficient volume of said color ink droplets, thereby serving to reduce ink volume consumption in both said fast draft quality print mode of operation and said slow high quality print mode of operation.

27. The color ink-jet printer of claim 26, wherein said draft quality print mode has a print resolution of about 300 dots per inch by 300 dots per inch.

28. The color ink-jet printer of claim 27, wherein said at least one low dot gain ink cartridge ejects a plurality of black ink droplets in said black text print mode of operation, and wherein each individual black ink droplet has a volume within the range of about 90 to 130 pL.

29. The color ink-jet printer of claim 27, wherein said at least one high dot gain ink cartridge ejects a plurality of color ink droplets in said color text print mode of operation, and wherein each individual color ink droplet has a volume within the range of about 40 to 65 pL.

30. The color ink-jet printer of claim 26, wherein said at least one low dot gain ink cartridge ejects a plurality of black ink droplets in said black text print mode of operation, wherein each individual black ink droplet has a volume within the range of about 90 to 130 pL, wherein said at least one high dot gain ink cartridge ejects a plurality of color ink droplets in said color text print mode of operation, and wherein each individual color ink droplet has a volume within the range of about 40 to 65 pL.

31. The color ink-jet printer of claim 26, wherein said high quality print mode has a print resolution of about 600 dots per inch by 300 dots per inch.

32. The color ink-jet printer of claim 31, wherein said at least one low dot gain ink cartridge ejects a plurality of black ink droplets in said black text print mode of operation and wherein each individual black ink droplet has a volume within the range of about 75 and 105 pL.

33. The color ink-jet printer of claim 32, wherein said each individual black ink droplet has a volume of about 90 pL.

* * * * *